United States Patent [19]
Jeon et al.

[11] Patent Number: 5,812,567
[45] Date of Patent: Sep. 22, 1998

[54] WAVELENGTH TUNABLE MODE-LOCKING OPTICAL FIBER LASER

[75] Inventors: Min Yong Jeon; Hak Kyu Lee; Kyong Hon Kim; El Hang Lee, all of Taejon, Rep. of Korea

[73] Assignee: Electronics and Telecommunications Research Institute, Daejeon, Rep. of Korea

[21] Appl. No.: 794,907

[22] Filed: Feb. 4, 1997

[30] Foreign Application Priority Data

Jul. 12, 1996 [KR] Rep. of Korea .................. 1996 28168

[51] Int. Cl.⁶ ....................................................... H01S 3/13
[52] U.S. Cl. ..................................... 372/6; 372/13; 372/18; 372/108
[58] Field of Search .................................. 372/6, 13, 18, 372/20, 32, 25, 29, 99, 108, 21

[56] References Cited

U.S. PATENT DOCUMENTS 5,477,555 12/1995 Debeau et al. ............................. 372/6
5,574,739 11/1996 Carruthers et al. ....................... 372/6

OTHER PUBLICATIONS

All-fiber sliding-frequency $Er^{3+}$/$Yb^{3+}$ soliton laser; D.O. Culverhouse, D.J. Richardson, T.A. Birks and P. St. J. Russel; pp. 2381–2383, vol. 20, No. 23; Dec. 1995.

Sliding-frequency figure-eight optical fibre laser; G. Town, J. Chow and M. Romagnoli; Electronics Letters; pp. 1452–1453; vol. 31, No. 17; Aug., 1995.

Primary Examiner—James W. Davie
Attorney, Agent, or Firm—Antonelli, Terry, Stout & Kraus, LLP

[57] ABSTRACT

The wavelength tunable mode-locking optical fiber laser comprises non-linear amplifying loop mirror part having a light pumping lase diode, a gain medium doped optical fiber having the gain medium for oscillating the rambling light wave sequentially, a dispersion shifted optical fiber, and first polarization controller for making the continuous oscillation light wave to be maximized by adjusting the polarization of said propagating light. All elements of the non-linear amplifying loop mirror part are combined to each other in loop type on the above clock direction., and linear mirror part having second polarization controller for adjusting the light wave oscillated by the non-linear amplifying loop mirror part to be mode-locked, Faraday rotation mirror for rotating the direction of polarization with degree, an acousto-optic tunable filter for changing the wavelength of the propagating light wave and for passing only the light wave with the defined linewidth, an optical isolator, and the 90:10 optical fiber directional coupler.

3 Claims, 4 Drawing Sheets

WAVELENGTH TUNABLE MODE-LOCKING OPTICAL FIBER LASER

BACKGROUND OF THE INVENTION

1. Field of the Invention

The present invention relates to a wavelength tunable mode-locking optical fiber laser and more particularly to the mode locking optical fiber laser the wavelength of which is variable on broad range with a acousto-optic tunable filter inserted in Erbium doped optical fiber laser.

2. Description of the Related Art

Optical fiber is constructed of single line cable or a plurality of combined cable which are made of glass or transparent resin such as composite resin, and is utilized in transmitting an information data, an optical image or optical power. Particularly, in the case of utilizing the optical fiber as transmission line, the weight becomes light and the relay spacing can be made long on low dissipation.

FIG. 1 illustrates a construction of conventional optical fiber laser with the figure-8-wavelength sliding type mode-locking (it is referred mode-locking oscillation if the synchronization is provided by the modulator so that the wavelength difference of resonance (mode spacing) is equal between the adjacent modes in the multi-mode oscillation laser).

Also, FIG. 2 illustrates a construction of conventional ring type sliding wavelength mode-locking optical fiber laser.

In FIG. 1 and FIG. 2, the conventional laser comprises a 50:50 optical fiber directional coupler (DC) or a fiber coupler (FC) 11, a wavelength division multiplier fiber coupler (WDM FC) 12, a 90:10 optical fiber directional coupler 13, first and second polarization controllers 21 and 22, a optical isolator 31, a dispersion shifted fiber 41, an Erbium doped optical fiber (optical gain medium) (EDF) 42, a 980 nm light pumping laser diode 51, a band pass filter 120, and Bragg's cell 130.

In the figure-8-type construction of FIG. 1, all the elements of the laser are not formed of optical fiber with the result being very high insertion loss. The reason for the above high loss is that Bragg's cell 130 and the band pass filter 120 are constructed of bulk-optic (bulk optic refers to such structure not constructed of monolithic optical fiber but in which optical fiber is connected to optical elements therebetween).

Also, said figure-8-type construction has a defect that wavelength tunability is possible only when the tunable filter is rotated.

Meanwhile, as illustrated by FIG. 2, the ring type construction utilizes a nulling coupler 112 (nulling coupler operates to add or remove the character to the flow of data without changing the content of information on data transmission), and thus only a narrow range of wavelength tunablity is achieved with a pheripheral side robe.

SUMMARY OF THE INVENTION

The present invention is devised to solve above problems, and the object of the present invention is to provide optical fiber laser for creating ultra-short pulse that has a very stable and large energy, the wavelength of which is tunable on broad range by including an acousto-optic tunable filter made of optical fiber in the construction employing the non-linear amplifying loop mirror part and Faraday rotation mirror of linear mirror part.

The wavelength tunable mode-locking optical fiber laser in accordance with the present invention for achiving said objects is characterized in that it is comprised of 90:10 optical fiber directional coupler which connects the acousto-optic tunable filter to the non-linear amplifying loop mirror part and linear mirror part therebetween so that a portion of light wave from said nonlinear amplifying loop mirror part is delivered to the linear mirror part and the another portion of the light wave is delivered to the output port, and thereafter the light wave reflected at the linear mirror part is returned to the non-linear amplifying loop mirror part.

BRIEF DESCRIPTIONS OF DRAWINGS

The aforementioned aspects and other features of the invention are explained in the following description, taken in conjunction with the accompanying drawings wherein.

DETAILED DESCRIPTION OF THE INVENTION

Figure 1:
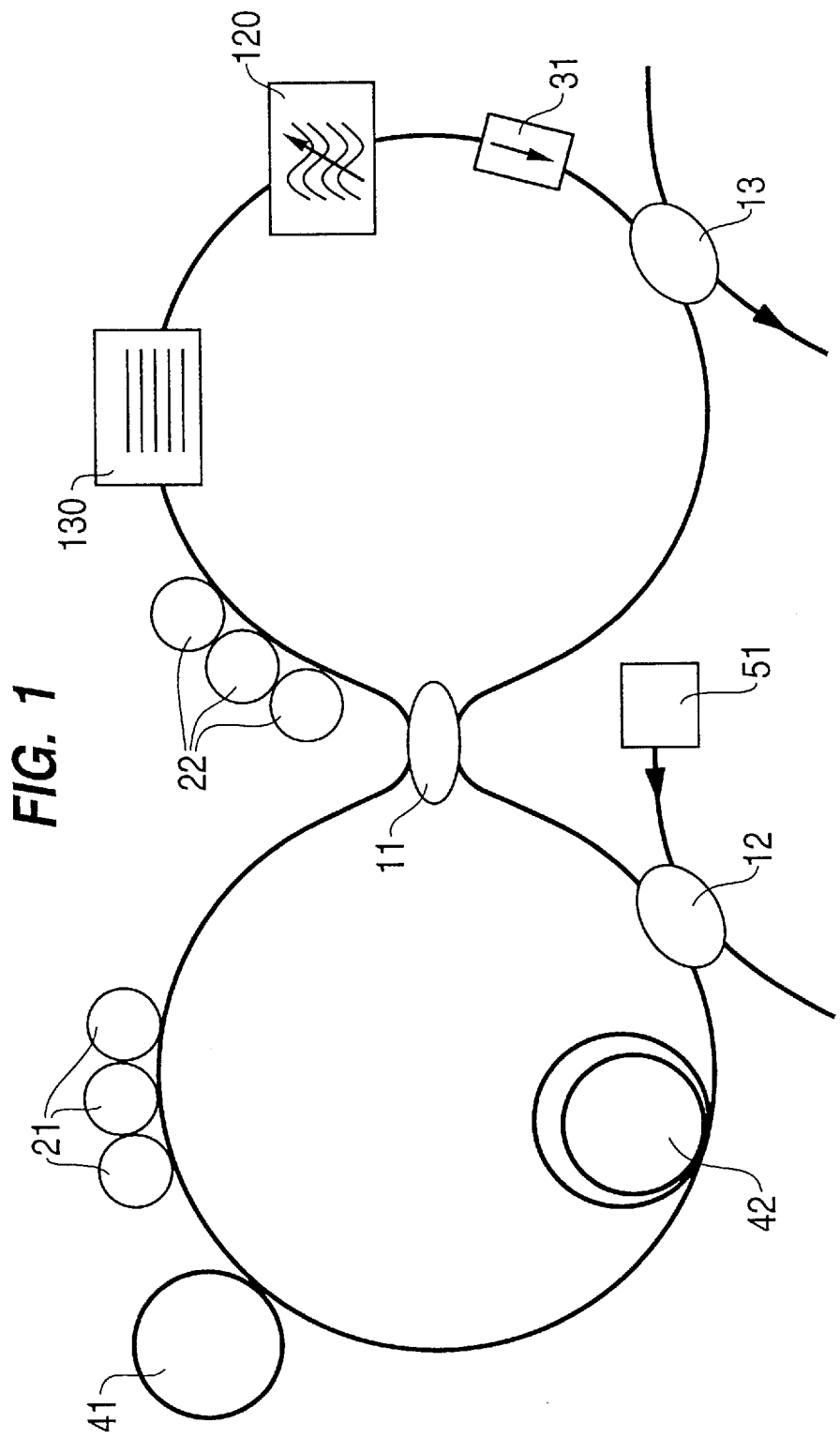
FIG. 1 illustrates a construction of conventional optical fiber laser with figure-8-type wavelength sliding mode-locking.
Figure 2:
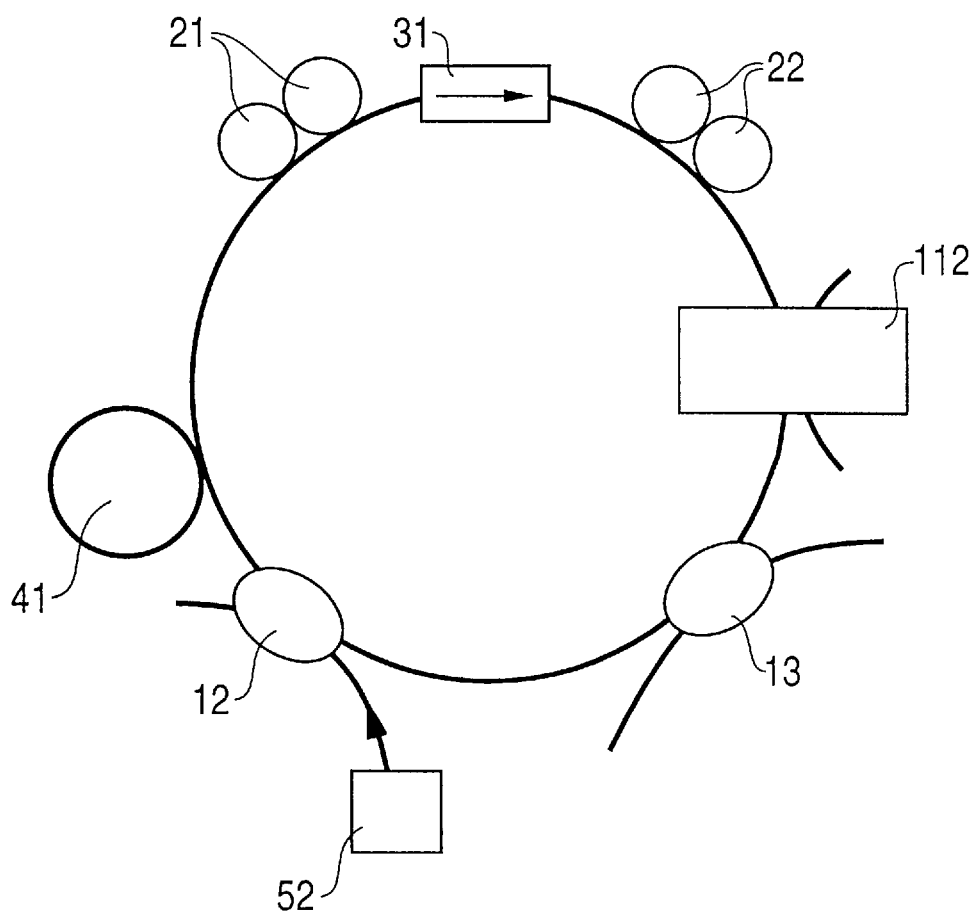
FIG. 2 illustrates a construction of conventional optical fiber laser with ring type wavelength sliding mode-locking.
Figure 3:
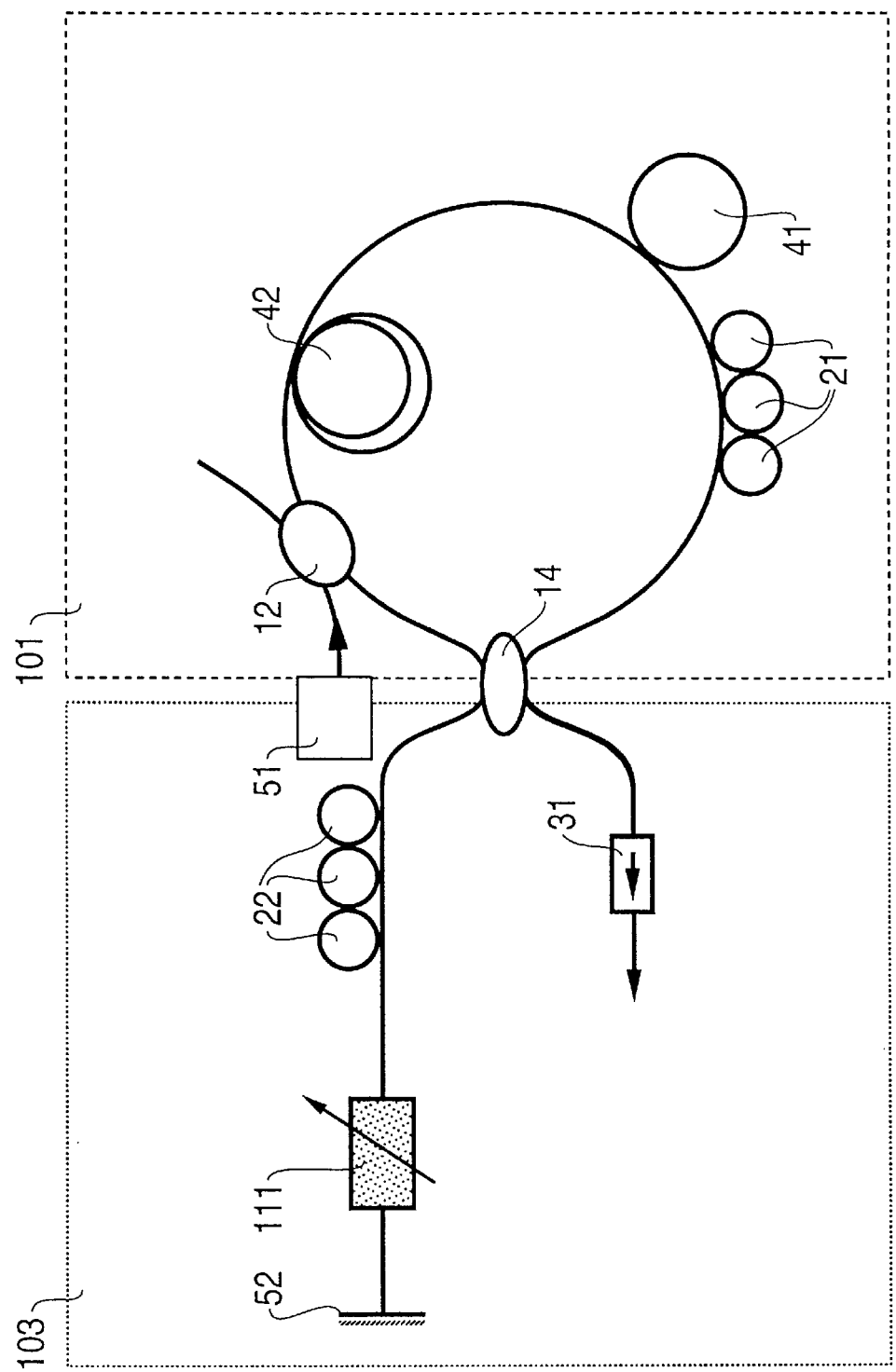
FIG. 3 illustrates a construction of optical fiber laser with wavelength tunable type sliding mode-locking in accordance with the present invention.

Referring to FIG. 3, the non-linear amplifying loop mirror part 101 comprises a light pumping lase diode 51 for outputting light for exitating a gain medium to induce oscillation of a rambling light wave, a gain medium doped optical fiber 42 for achiving population inversion between the upper and lower energy level when the light of the laser diode 51 is inputted and for oscillating the rambling light wave sequentially, a wavelength division optical fiber coupler 12 for delivering light from the laser diode to gain medium doped optical fiber, a dispersion shifted optical fiber 41, and first polarization controller 21 for making the continues oscillation light wave to be maximized by adjusting the polarization of the oscillation light, and all elements of the non-linear amplifying loop mirror 101 are combined to each other in loop type on the above clock direction.

Linear mirror part 103 comprises second polarization controller 22 for adjusting the light wave oscillated by the non-linear amplifying loop mirror part 101 to be mode-locked, Faraday rotation mirror 52 for rotating the direction of polarization by 90 degree when the oscillated propagating light wave is reflected by the polarization surface, an acousto-optic tunable filter 111 for changing the wavelength of the propagating light wave and for passing only the light wave with the defined linewidth, and an optical isolator 31 for prohibiting the reflection of light wave outputted via third optical fiber directional coupler 14 from the non-linear amplifying loop mirror 101.

The details of the present invention is explained as follows in accordance with the above constructions.

Firstly, if the light pumping laser diode 51 outputs light to the wavelength division optical fiber laser coupler 12, the laser coupler 12 delivered the output light to the gain medium doped optical fiber for achiving oscillation of the rambling light wave. The exitated light is inputted to the Erbium doped fiber 42 so that the delivered light is to be amplified. The Erbium atom transits to high energy state by the input light signal with the stimulated emission resulted. Finally, the light oscillates on new wavelength during propagation in the optical fiber.

Also, the dispersion shifted fiber 41 allows non-linear effect to be raised to the oscillating and propagating light in the gain medium doped optical fiber. This enables the continues oscillation light wave formed by first polarization controller 21 to be maximized.

Also, second polarization controller 22 adjusts the polarization of the light wave which oscillates in the non-linear amplifying loop mirror 101 via the route from the non-linear amplifying loop mirror part 101 to 48:52 optical fiber directional coupler 14 to be passive mode-locking.

The acousto-optic tunable filter 111 shifts the wavelength of input light controlled by second polarization controller and passes only the light with the defined linewidth.

As a result, the passed light is reflected again by the Faraday rotation mirror 103 and returned to the non-linear amplifying loop mirror 101 to form a laser resonance cavity.

As illustrated by the FIG. 3, when the acousto-optic tunable filter 111 is inserted between the Faraday rotation mirror 52 and second polarization controller 22 of the linear mirror part 103, passive mode-locking laser pulse can be wavelength tunable.

The operation for allowing the wavelength of passive mode-locking laser pulse to be varied will be explained as follows.

The acousto-optic tunable filter 111 not only shifts the wavelength of propagating light in the laser cavity to be continuously varied but also passes only the light with the defined spectrum bandwidth. Therefore, whenever the continues wave with low power circulates once in the cavity, the wavelength of light is shifted and filtered with the defined spectrum bandwidth. Consequently, the light can not oscillate if circulating many times in the cavity.

Notwithstanding, the laser pulse with high power is reshaped while the wavelength of light is shifted and filtered with the defined spectrum bandwidth, and thus can oscillates continuously as a pulsed laser.

Therefore, utilizing the present invention for making the wavelength of the acoustic wave applied to the acousto-optic wave to be consistent with the wavelength of the circulating period of the laser cavity, the pulse is oscillated actively by the mode-locking with the consistent wavelength.

Figure 4:
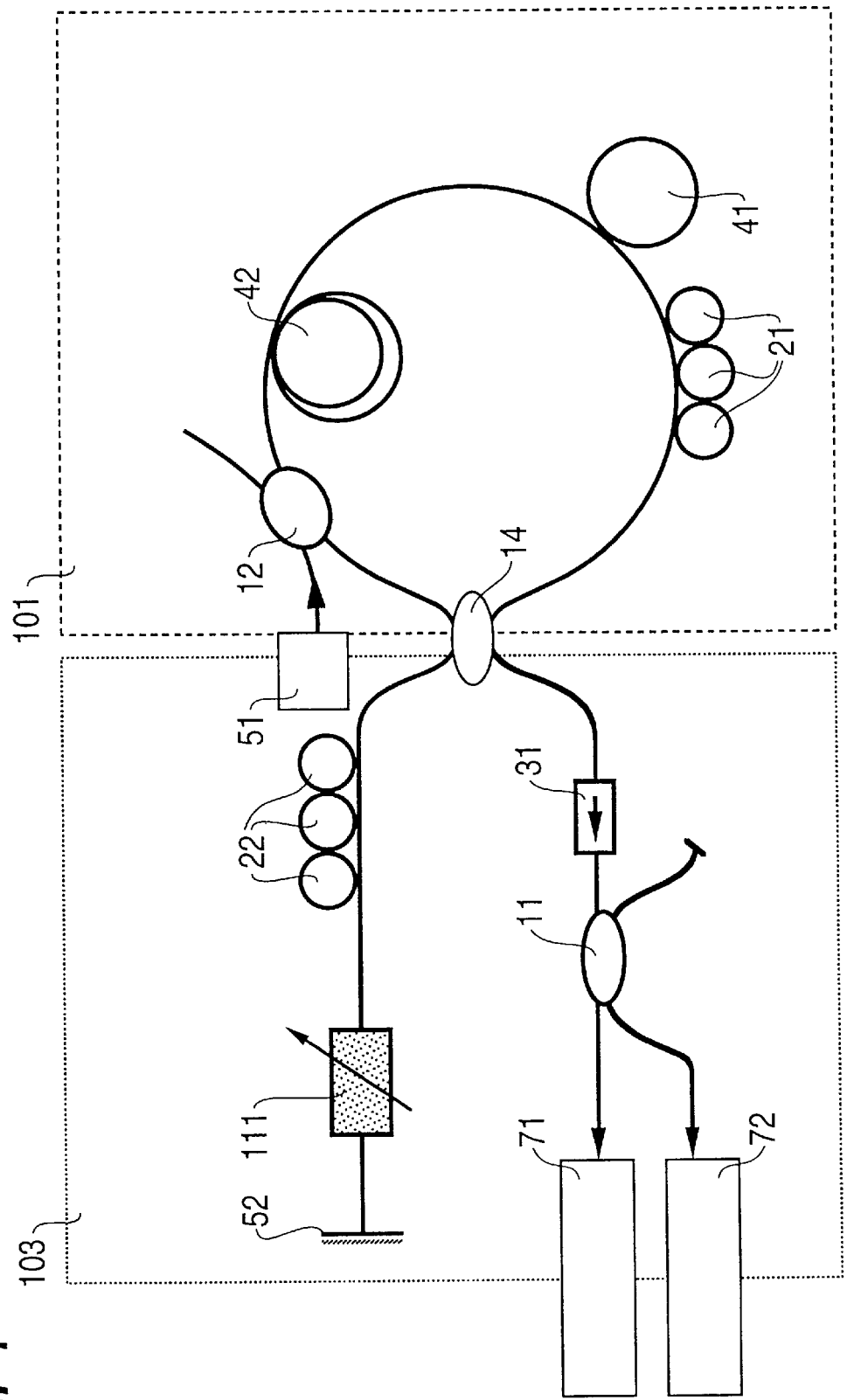
FIG. 4 illustrates a construction of the experimental apparatus in accordance with the present invention.

FIG. 4 illustrates the construction of experiment apparatus of the present invention. The experiment apparatus comprises third optical directional coupler 14, the wavelength division optical fiber coupler 12, first and second polarization controllers 21 and 22, the light isolator 31, the dispersion shifted optical fiber 41, Erbium doped optical fiber 42, 980 nm light pumping laser diode 51, Faraday rotation mirror 52, the acousto-optic tunable filter 111, a light spectrum analyzer 71, an auto-correlation measuring apparatus, the non-linear amplifying loop mirror part 101, and the linear mirror part 103.

In accordance with the above constructions, the 10 m long optical fiber with the Erbium doping concentration 800 ppm is disposed at the one end of the loop. The 17 m dispersion shifted optical fiber 41 with 1550 nm dispersion wavelength is disposed at the other part of the loop to induce non-linear effect.

First polarization controller 21 is inserted to rotate the polarization within the loop.

The abstract dispersion value of D of the dispersion shifted optical fiber at 1550 nm for achiving non-linear effect is 3.5 ps/nm/km.

And, light pumping is conducted by 980 nm semiconductor laser 51 utilizing 980/1550 wavelength division optical fiber coupler 12.

The linear mirror part 103 comprises the acousto-optic tunable filter 111 for shifting the wavelength of light and transmitting the light with the defined linewidth, Faraday rotating mirror 52 for rotating the polarization of light reflected therewith by 90 degree with respect to the incident light, and second polarization controller 22 for adjusting the polarization state.

The non-linear amplifying loop mirror part 101 and the linear mirror part 103 are connected to each other by 48:52 optical fiber directional coupler.

According to the above connections, the total length of non-linear amplifying loop mirror part 101 becomes 29 m long and the total length of linear mirror part 103 becomes 10 m long. The longitudinal spacing of resonator corresponding to these lengths is 4.2 Mhz.

The output optical signal is received via the another port of the non-linear amplifying loop mirror part 101. In this case, the threshold value of pumping output for continuous oscillation is about 7 mW. The passive mode-locking is easily produced at the pumping output beyond about 15 mW. The oscillating mode of continuous oscillation is reduced due to the spectrum filtering effect of the acousto-optic tunable filter 111 and the wavelength shift of center oscillation wavelength with the result that oscillation is disturbed.

However, the pulse mode with high power continuously oscillates because this mode is reshaped by the spectrum filtering even though the center wavelength is shifted due to the non-linear state of light in the laser cavity.

Therefore, the wavelength tunable characteristics of ultra-short optical pulse is achieved by changing the wavelength applied to the acousto-optic tunable filter 111.

In accordance with the above constructions, the passive mode-locking is achieved, the wavelength of light is tunable on broad range, and the very stable pulse with narrow pulse width is produced by the construction with the acousto-optic tunable filter 111 inserted.

The modifications or alterations to the present invention will be made by the skilled person in the art. For example, the mode-locking laser wavelength with short pulse width is tunable by changing the wavelength applied to above acousto-optic tunable filter 111 with the acousto-optic tunable filter 111 inserted within the non-linear amplifying loop mirror part 101.

It is therefore intended by the appended claims to cover any and all such applications, modifications, and embodiments within the scope of the present invention.

What is claimed is:

1. The wavelength tunable mode-locking optical fiber laser comprising;
   a non-linear amplifying loop mirror comprising;
      a light pumping laser diode for exitating a gain medium to induce the oscillation of rambling light wave;
      a gain medium doped optical fiber having the gain medium for oscillating the rambling light wave sequentially;
      a dispersion shifted optical fiber for allowing non-linear effect to be raised to the oscillated and propagating light in the gain medium optical fiber which is outputted from the light pumping laser diode, and
      first polarization controller for making the continues oscillation light wave to be maximized by adjusting the polarization of said propagating light in the gain medium doped optical fiber, wherein all elements of the non-linear amplifying loop mirror are combined to each other in loop type on the above clock direction; and a linear mirror part comprising;
- a 90:10 optical fiber directional coupler which couples the non-linear amplifying loop mirror part to the linear mirror part so that a portion of light wave from the non-linear amplifying loop mirror is delivered to the linear mirror part and the another portion of the light wave is delivered to an output port;
- second polarization controller disposed at the light path from the 90:10 optical fiber directional coupler for adjusting the polarization of light oscillated by the non-linear amplifying loop mirror part to be mode-locked;
- an acousto-optic tunable filter disposed at the light path from the second polarization controller for shifting the wavelength of the propagating light continuously and for passing only the light with the defined linewidth; and
- Faraday rotation mirror disposed at the light path from the acousto-optic tunable filter for rotating the direction of polarization with 90 degree when the propagating light is reflected by the polarization surface therewith, wherein the light reflected at the linear mirror part is returned to the non-linear amplifying loop mirror to form a laser cavity resonator.

2. The apparatus of claim 1, wherein the mode-locking laser wavelength with narrow pulse width is tunable by changing the acoustic wave applied to the acousto-optic tunable filter.

3. The apparatus of claim 1, wherein by making the wavelength of the acoustic wave applied to the acousto-optic tunable filter to be consistent with the wavelength of the circulating period of the laser cavity resonator, the pulse is actively oscillated by the mode-locking with the consistent wavelength.

* * * * *